(12) United States Patent
Liu

(10) Patent No.: US 8,108,986 B2
(45) Date of Patent: Feb. 7, 2012

(54) METHOD FOR MANUFACTURING A PERPENDICULAR MAGNETIC WRITE POLE HAVING A LARGE BEVEL ANGLE

(75) Inventor: Yinshi Liu, Foster City, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 508 days.

(21) Appl. No.: 11/966,164

(22) Filed: Dec. 28, 2007

(65) Prior Publication Data

US 2009/0168242 A1 Jul. 2, 2009

(51) Int. Cl.
*G11B 5/127* (2006.01)
*H04R 31/00* (2006.01)

(52) U.S. Cl. ............... 29/603.16; 29/603.12; 29/603.13; 29/603.14; 29/603.15; 29/603.18; 216/62; 216/65; 216/66; 360/121; 360/122; 360/317; 451/5; 451/41

(58) Field of Classification Search .................. None
See application file for complete search history.

(56) References Cited

U.S. PATENT DOCUMENTS

| | | | | |
|---|---|---|---|---|
| 4,153,529 A | 5/1979 | Little et al. | ..................... | 204/192 |
| 4,278,493 A | 7/1981 | Petvai | ............................. | 156/643 |
| 4,758,304 A | 7/1988 | McNeil et al. | ................ | 156/626 |
| 6,835,289 B2 | 12/2004 | Yamashita | ................ | 204/192.11 |
| 6,920,685 B2 | 7/2005 | Oike et al. | ................. | 29/603.16 |
| 6,967,340 B2 | 11/2005 | Lee et al. | ................. | 250/492.21 |
| 2006/0289802 A1 | 12/2006 | Nakaya | ..................... | 250/492.21 |
| 2007/0124917 A1* | 6/2007 | Balamame et al. | ........ | 29/603.14 |
| 2007/0184596 A1 | 8/2007 | Ando | ............................ | 438/172 |

FOREIGN PATENT DOCUMENTS

| | | |
|---|---|---|
| JP | 61106779 | 5/1986 |
| JP | 3290838 | 12/1991 |
| JP | 4331800 | 11/1992 |
| JP | 2000021343 | 1/2000 |
| JP | 2002158211 | 5/2002 |
| JP | 2006/324205 | 11/2006 |

OTHER PUBLICATIONS

Okada et al., "Fabrication Process for a Trapezoidal Main Pole for Single-Pole-Type Heads", IEEE Transactions on Magnetics, vol. 38, No. 5, Sep. 2002.

Okada et al., "Fabricating Narrow and Trapezoidal Main Poles for Single-Pole-Type Heads", IEEE Transactions on Magnetics, vol. 40, No. 4, Jul. 2004.

* cited by examiner

*Primary Examiner* — Paul D Kim

(74) *Attorney, Agent, or Firm* — Zilka-Kotab, PC

(57) ABSTRACT

A method for manufacturing a magnetic write head for perpendicular magnetic recording, the write head having a write pole with an increased bevel (taper) angle. The write pole is constructed by forming a mask structure over a magnetic write pole material, and then performing a combination of sweeping or rotation with static (non-rotating, non-sweeping) ion milling at an angle relative to normal. The ion milling is performed while moving the wafer laterally within the ion milling tool to ensure that the ion milling is performed uniformly across the wafer during static milling.

13 Claims, 16 Drawing Sheets

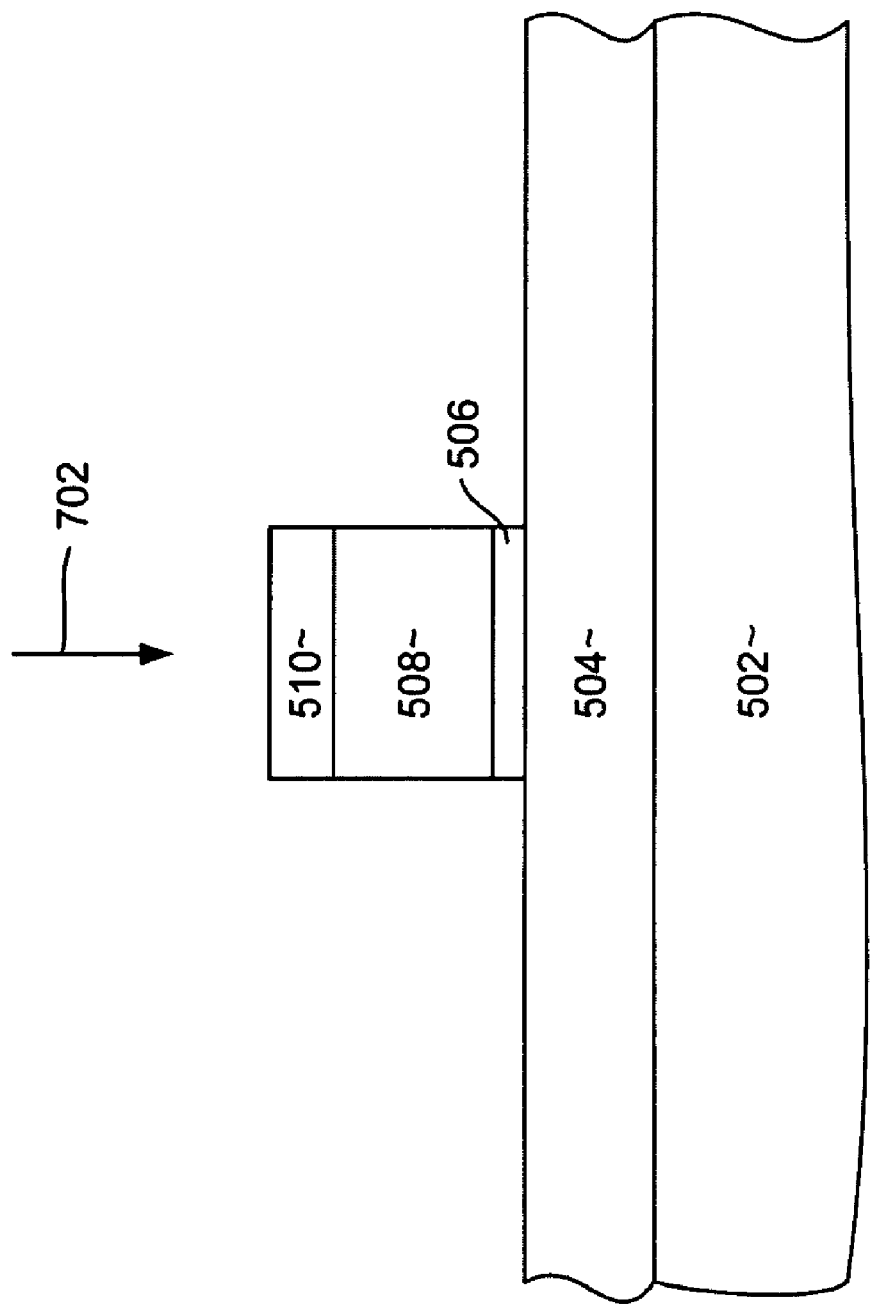

METHOD FOR MANUFACTURING A PERPENDICULAR MAGNETIC WRITE POLE HAVING A LARGE BEVEL ANGLE

FIELD of THE INVENTION

The present invention relates to perpendicular magnetic recording and more particularly to a method for manufacturing a magnetic write head having pole with an increased bevel angles.

BACKGROUND of THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on that rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recordings systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

SUMMARY OF THE INVENTION

The present invention provides a method for manufacturing a magnetic write head for perpendicular magnetic recording, the write head having a write pole with an increased bevel (taper) angle without sacrificing ion mill uniformity. The write pole is constructed by forming a mask structure over a magnetic write pole material, and then performing a static (non-rotating, non-sweeping) ion milling at an angle relative to normal. The ion milling is performed while moving the wafer laterally within the ion milling tool to ensure that the ion milling is performed uniformly across the wafer.

The method advantageously allows a write pole to be formed with a higher bevel angle than would be possible using a sweeping ion milling. On the other hand, the method offers better ion mill uniformity than is achievable with the conventional static mill. The present invention can construct a write pole having side walls that define bevel or taper angle of about 10 degrees.

The method also advantageously allows for a shorter ion milling time, allowing a thinner mask to be used and resulting in improved write pole definition and uniformity.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
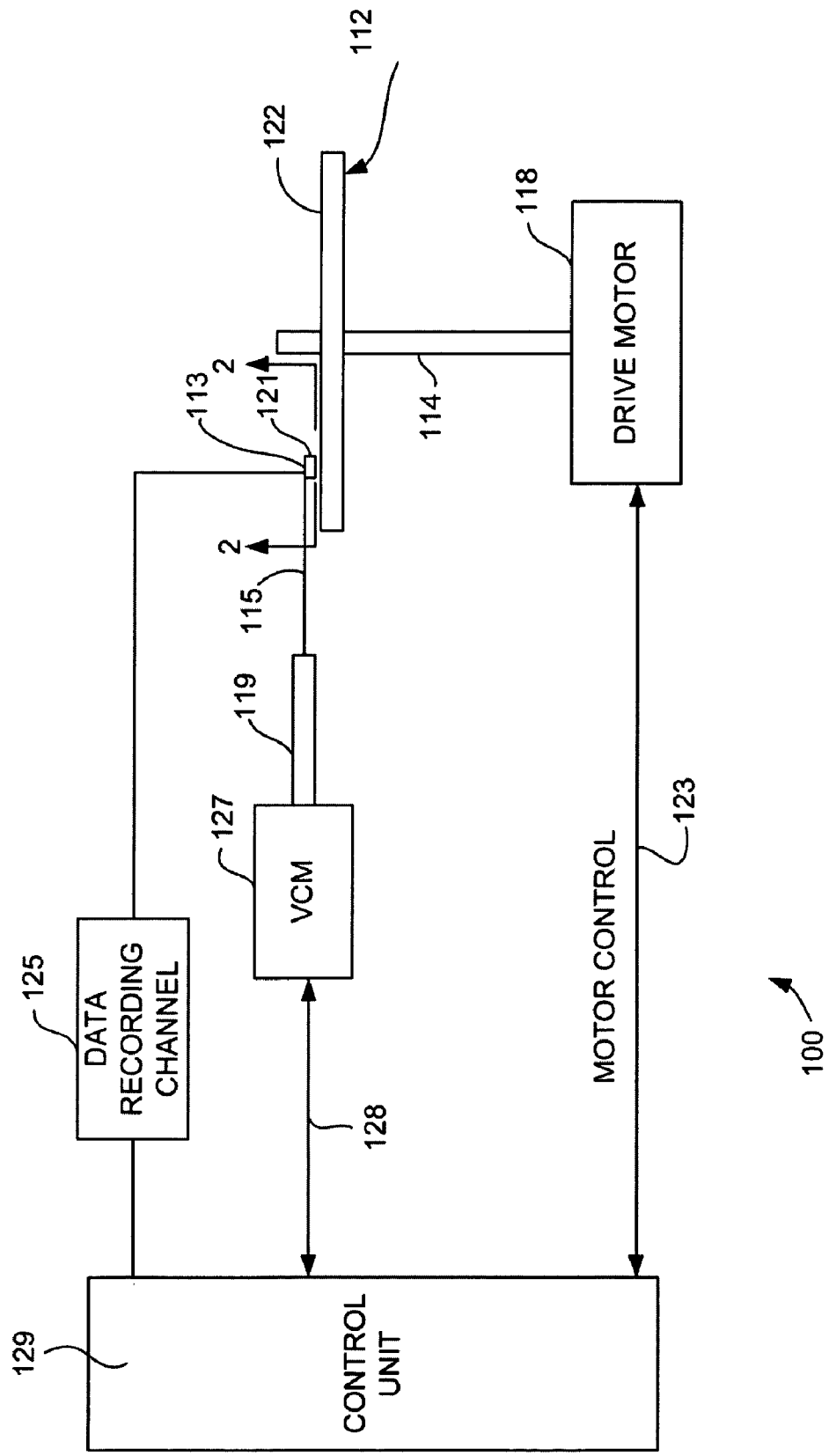
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
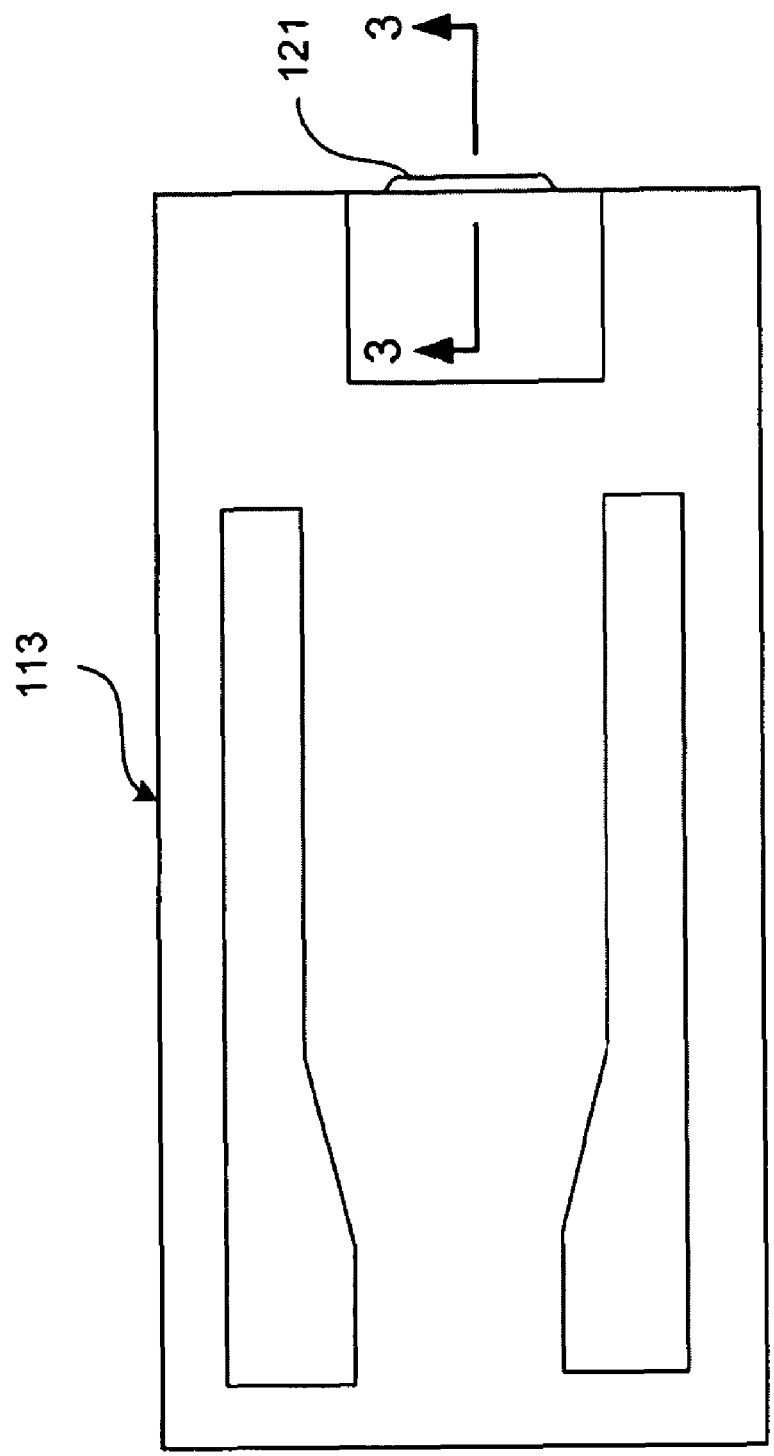
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
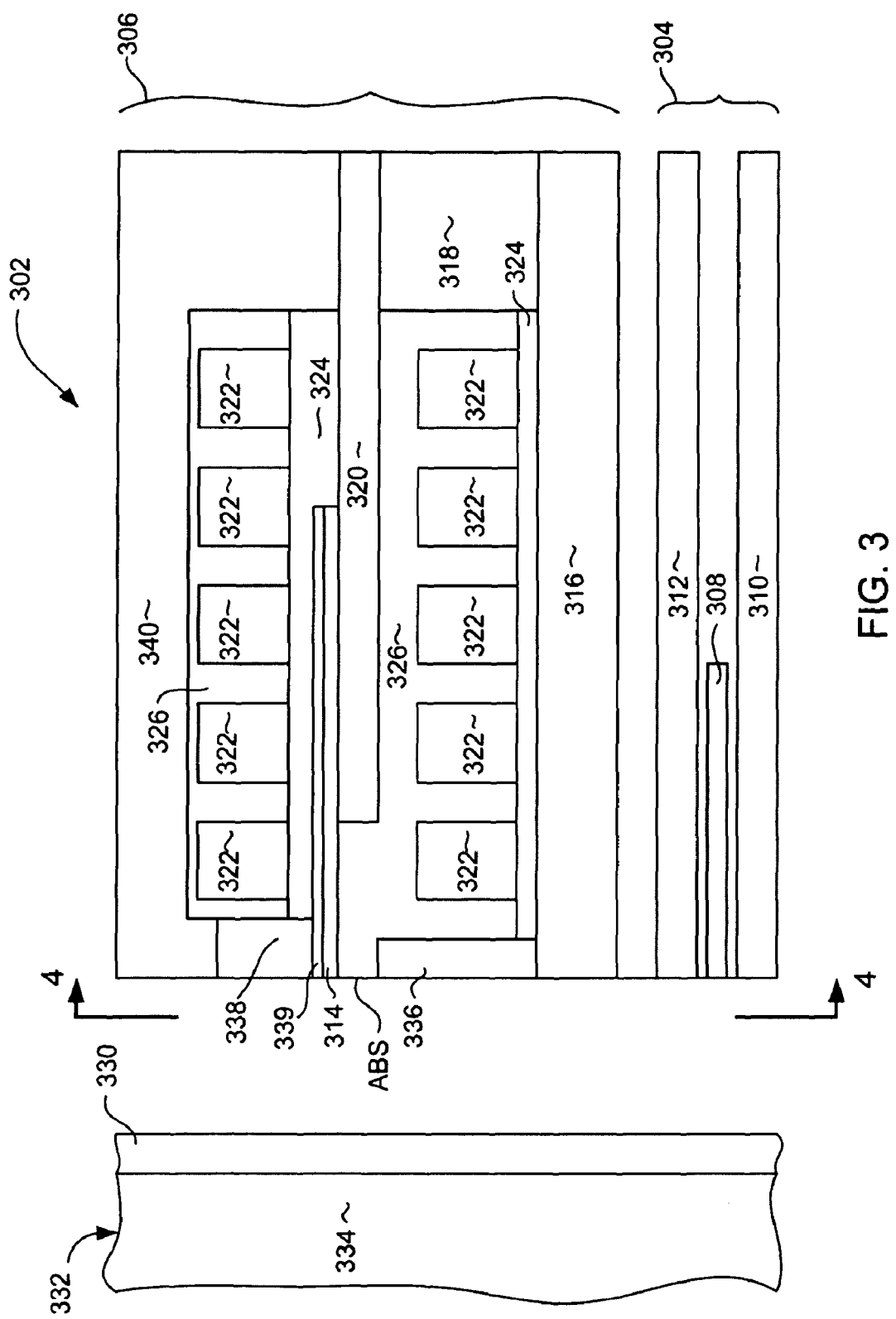
FIG. 3 is a cross sectional view of a magnetic head, taken from line 3-3 of FIG. 2 and rotated 90 degrees counterclockwise, of a magnetic write head according to an embodiment of the present invention.

With reference now to FIG. 3, the invention can be embodied in a magnetic head 302. The magnetic head 302 includes a read head 304 and a write head 306. The read head 304 includes a magnetoresistive sensor 308, which can be a GMR, TMR, or some other type of sensor. The magnetoresistive sensor 308 is located between first and second magnetic shields 310, 312.

The write head 306 includes a magnetic write pole 314 and a magnetic return pole 316. The write pole 314 can be formed upon a magnetic shaping layer 320, and a magnetic back gap layer 318 magnetically connects the write pole 314 and shaping layer 320 with the return pole 316 in a region removed from the air bearing surface (ABS). A write coil 322 (shown in cross section in FIG. 3) passes between the write pole and shaping layer 314, 320 and the return pole 316, and may also pass above the write pole 314 and shaping layer 320. The write coil 322 can be a helical coil or can be one or more pancake coils. The write coil 322 can be formed upon an insulation layer 324 and can be embedded in a coil insulation layer 326 such as alumina and or hard baked photoresist.

In operation, when an electrical current flows through the write coil 322, a resulting magnetic field causes a magnetic flux to flow through the return pole 316, back gap 318, shaping layer 320 and write pole 314. This causes a magnetic write field to be emitted from the tip of the write pole 314 toward a magnetic medium 332. The write pole 314 has a cross section at the ABS that is much smaller than the cross section of the return pole 316 at the ABS. Therefore, the magnetic field emitting from the write pole 314 is sufficiently dense and strong that it can write a data bit to a magnetically hard top layer 330 of the magnetic medium 332. The magnetic flux then flows through a magnetically softer under-layer 334, and returns back to the return pole 316, where it is sufficiently spread out and week that it does not erase the data bit recorded by the write head 314.

In order to increase write field gradient, and therefore, increase the recording density, a trailing magnetic shield or trailing wrap-around shield 338 can be provided. The magnetic shield 338 is separated from the write pole by a non-magnetic write gap 339, and may be connected with the shaping layer 320 and/or back gap 318 by a trailing return pole 340. The trailing shield 338 attracts the magnetic field from the write pole 314, which slightly cants the angle of the magnetic field emitting from the write pole 314. This canting of the write field increases the recording density which write field polarity can be switched by increasing the field gradient.

Figure 4:
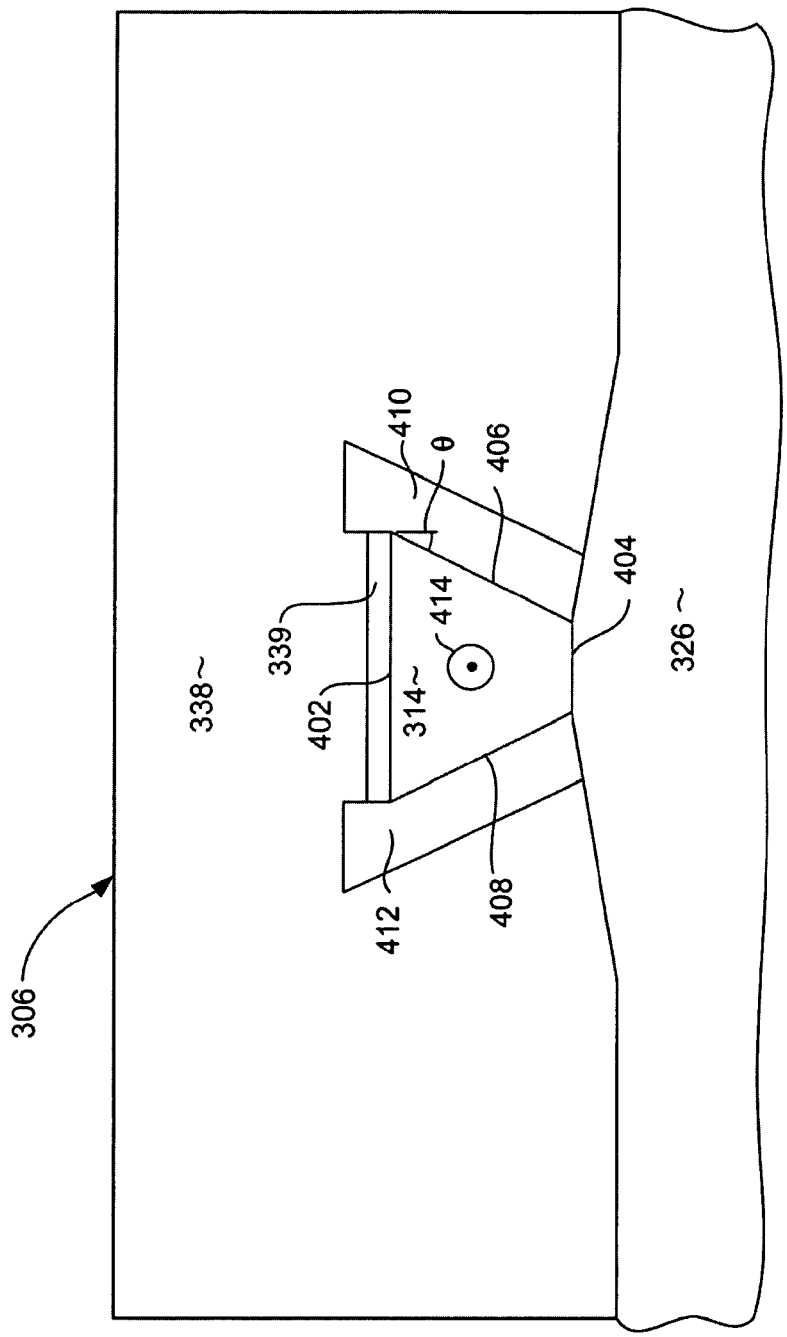
FIG. 4 is an ABS view of a portion of the write head of FIG. 3.
Figure 5:
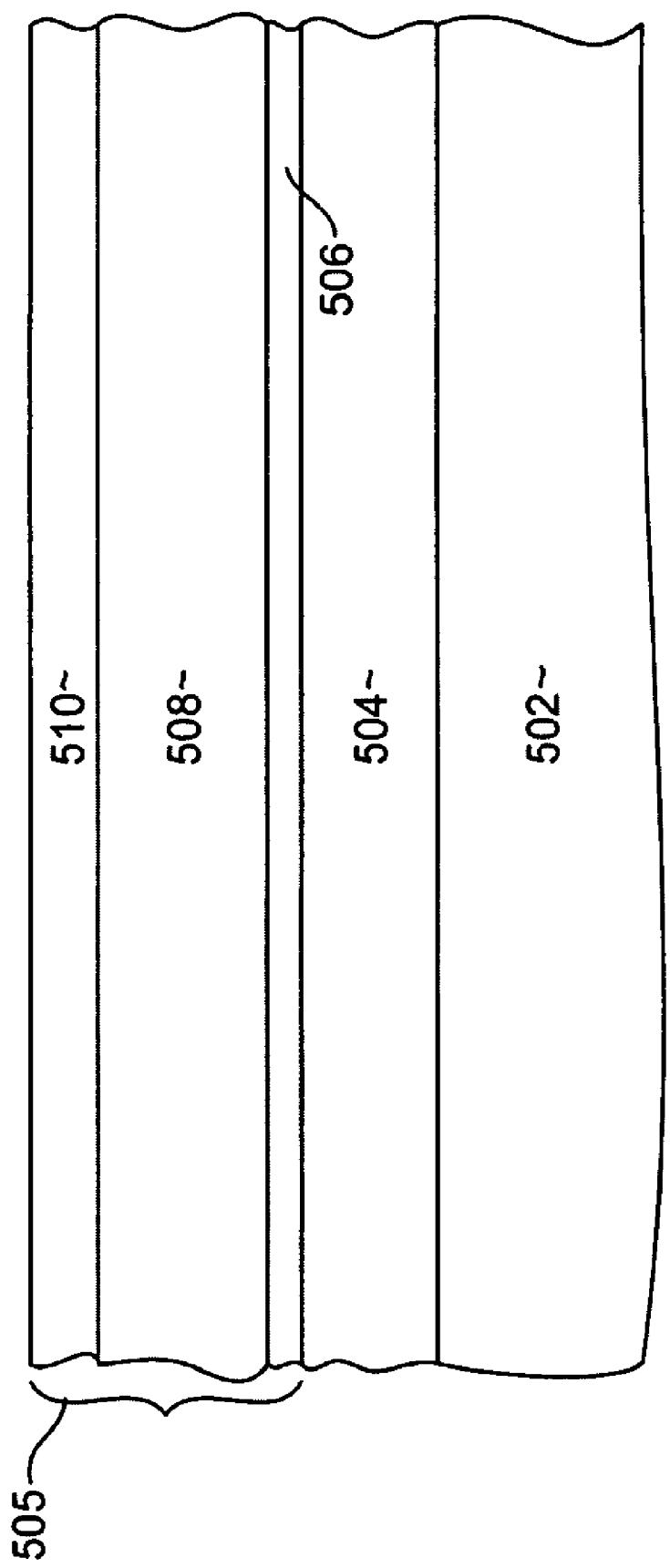
FIGS. 5-9 are views of a write head in various intermediate stages of manufacture illustrating method for manufacturing a write head according to an embodiment of the invention.

FIG. 4 shows an enlarged view of a portion of the write head 306 around the write pole 314 as viewed from the air bearing surface (ABS). As can be seen, the write pole 314 has a trailing edge 402, a leading edge 404 and has first and second laterally opposed tapered sides 406, 408 that each extend from the trailing edge 402 to the leading edge 404, forming a trapezoidal cross section as viewed from the ABS. The write pole 314 has a longitudinal axis that is out of the plane of the paper as shown in FIG. 4, as indicated by arrow head symbol 414. The sides 406, 408 are tapered at an angle θ relative to normal, the angle θ being larger than other prior art write heads. The angle θ can be about 10 degrees. This increased taper angle θ is made possible by a novel manufacturing method that will be described in greater detail herein below.

As discussed above, the write head 306 can include a wrap-around trailing magnetic shield 338. As seen in FIG. 4, the shield 338 can wrap around the write pole 314, thereby providing side shielding as well as trailing shielding. The trailing shield 338 is separated from the trailing edge 402 of the write pole 314 by the non-magnetic trailing gap layer 339, and is separated from the sides 406, 408 of the write pole 314 by first and second side gap layers 410, 412. The non-magnetic trailing gap layer 339 and side gap layers 410, 412 can be constructed of alumina or some other non-magnetic material.

Prior art methods for manufacturing write heads have used an ion milling performed in either sweeping or rotational or static mode. The sweeping and rotational modes are not effective in creating large bevel angles, but have advantage of good uniformity. Static mode is effective in generating large bevel angles, but has poor uniformity. The wafer chuck can only do tilting and rotating during ion mill. The present invention, however provides the advantages of good uniformity as well as a large bevel angle. An example of such a method is described below.

FIGS. 5-14 illustrate a method for manufacturing a magnetic write pole having an increased taper (or bevel) angle θ, such as that discussed above. With particular referenced to FIG. 5 a magnetic write pole material 504 is deposited over a substrate 502. The substrate 502 can include the fill layer 326 and all or a portion of the shaping layer 320 described above with reference to FIG. 3. The magnetic write pole material 504 is preferably a lamination of magnetic layers such as CoFe separated by thin non-magnetic layers, and/or by thin soft magnetic layers. A series of mask layers 505 are deposited over the write pole material. The mask layers 505 can include: a hard mask layer 506 such as a thin alumina layer; an image transfer layer 508, which can be a soluble polyimide material such as DURAMIDE®; and a layer of photoreactive material such as photoresist 510.

Figure 6:
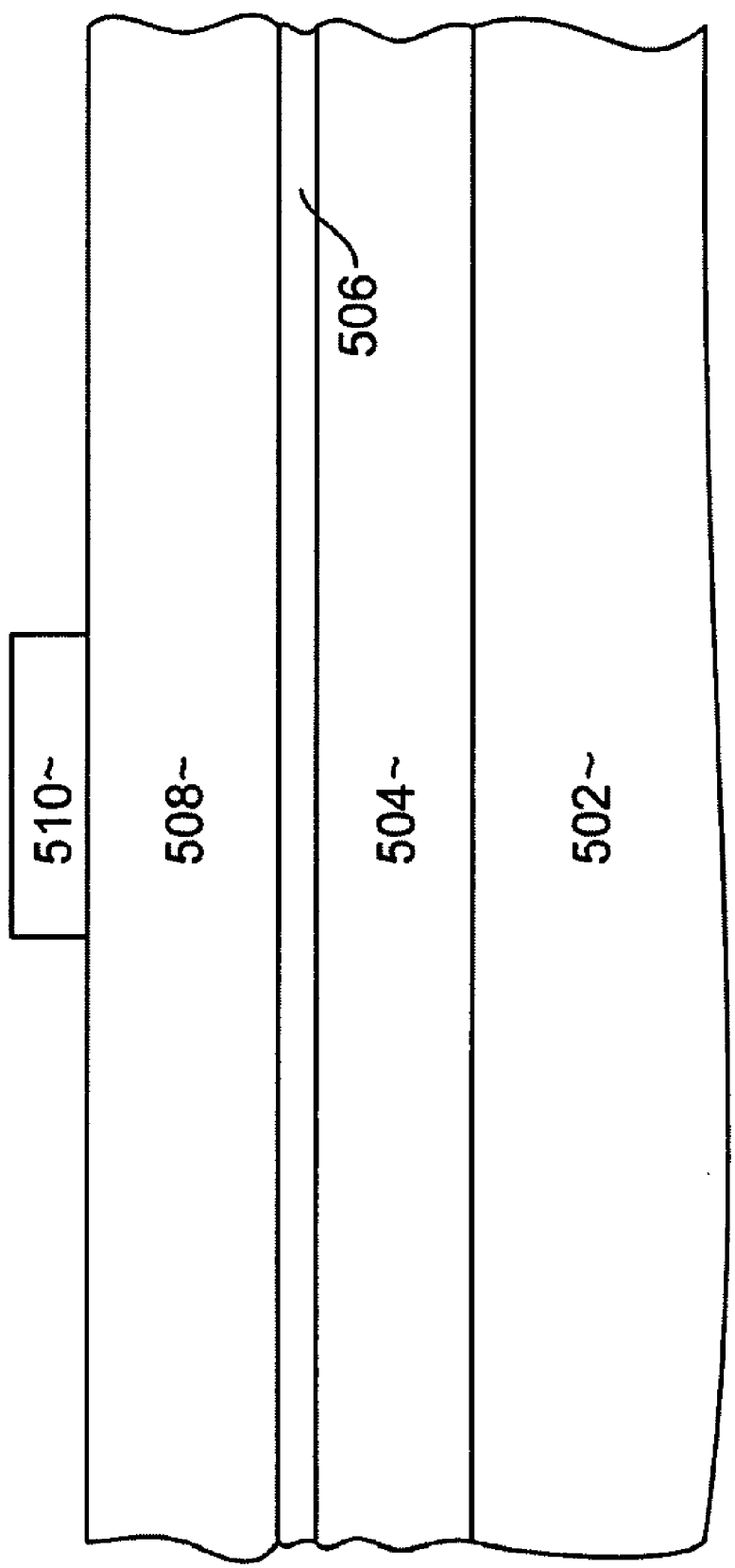

With reference now to FIG. 6, the photoresist layer 510 is photolithographically patterned to define a write pole pattern as shown in cross section in FIG. 6. Then, a reactive ion etch (RIE) is performed to transfer the image of the photoresist layer 510 onto the underlying image transfer layer 508 and hard mask layer 506 by removing portions of the layers 508 that are not protected by the photoresist mask 510. Then, an ion milling is performed to transfer the image of the photoresist further to the write pole material 504 by removing portions of layer 506 that are not protected by the photoresist mask 510. This ion milling can be referred to as an image transfer ion milling. The photoresist layer 510 may be removed during this ion milling process resulting in a structure as shown in FIG. 7a. This image transfer ion milling is preferably performed in a direction perpendicular to the plane of the layers 502, 5504 as indicated by arrow 702. In other words, this image transfer layer is a zero angle ion milling.

Figure 7:
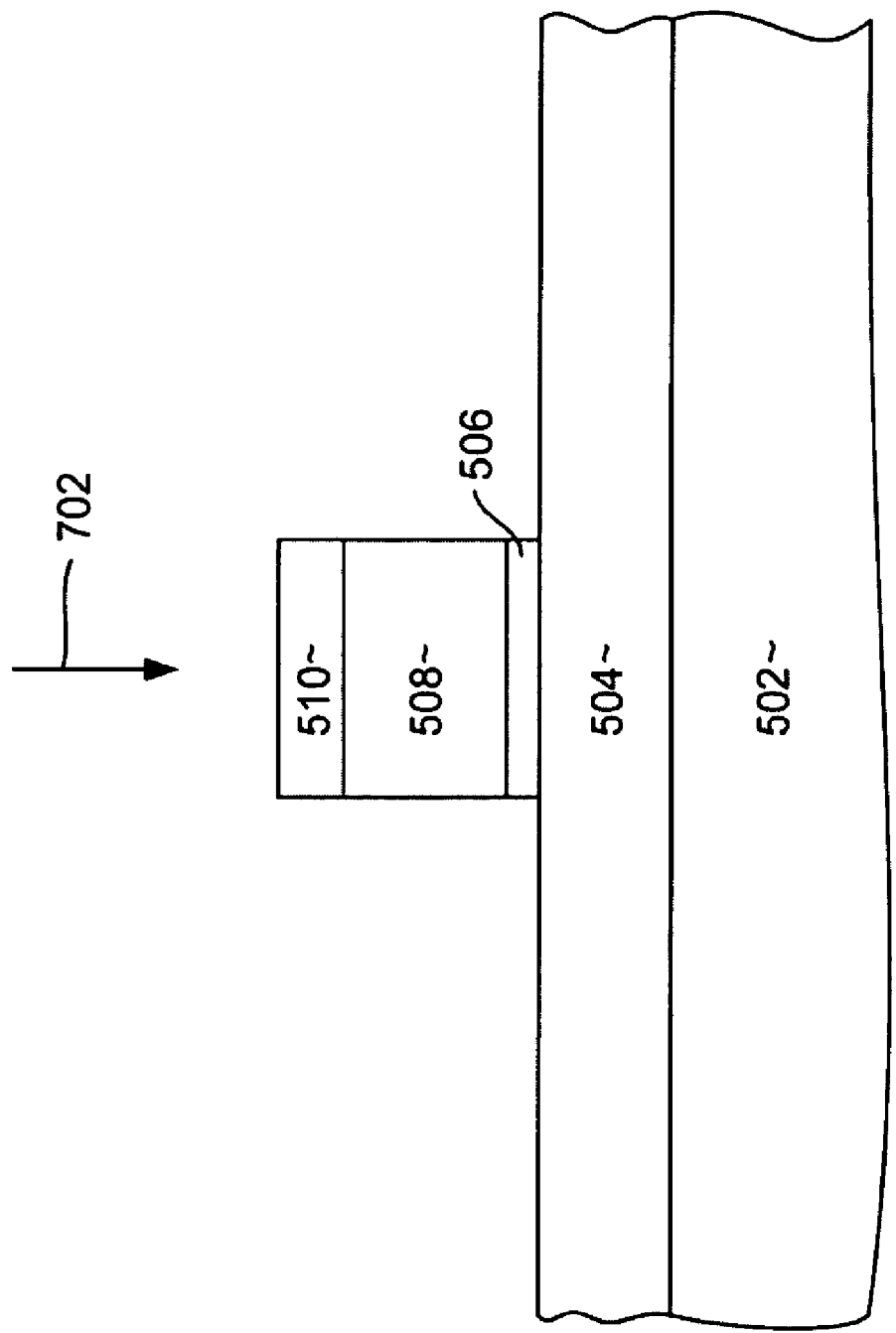
Figure 7B:
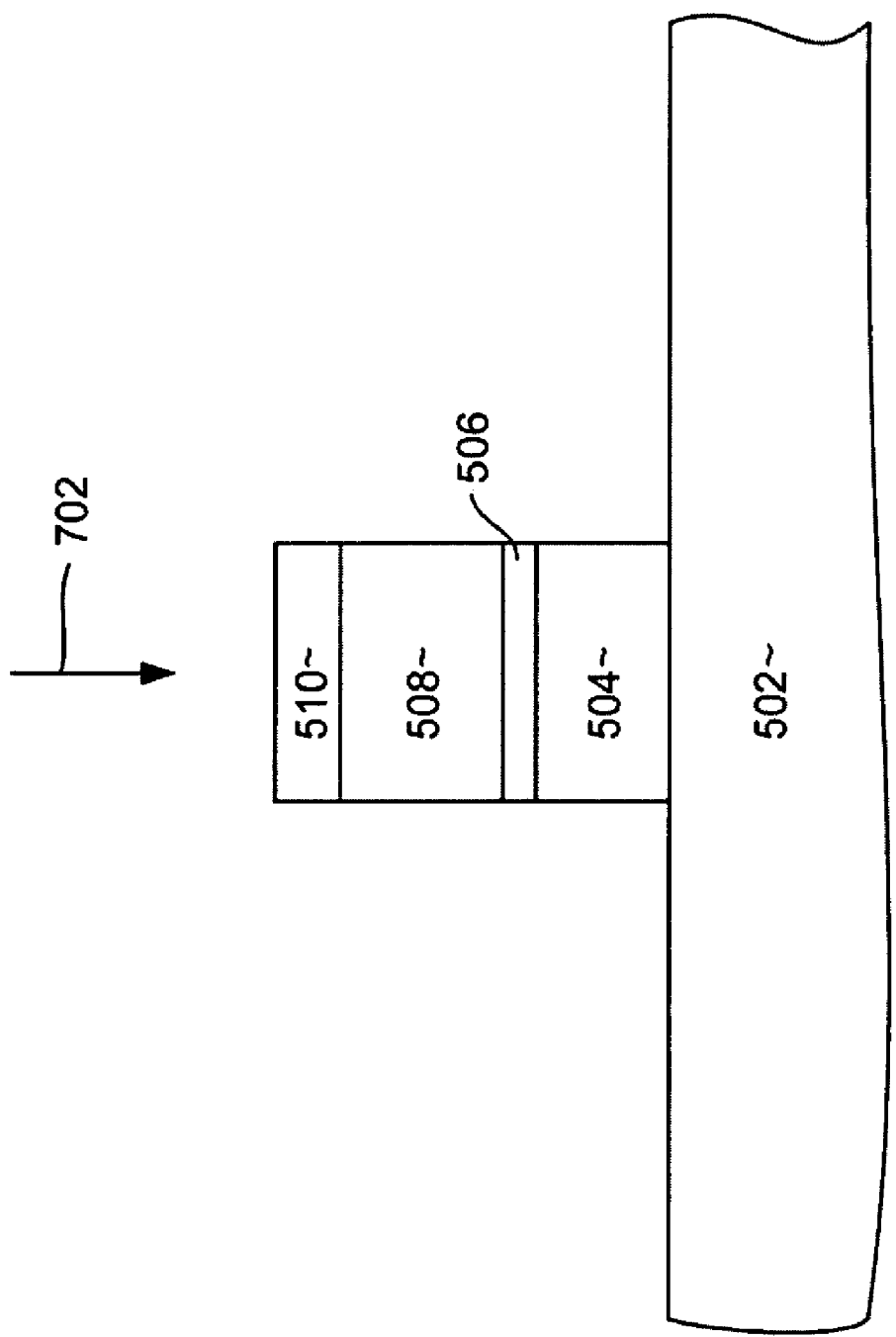

With reference now to FIG. 7b, the first step of ion milling is performed to remove a portion of the write pole material that is not protected by the remaining mask layers 506, 508. As those skilled in the art will appreciate, the write head is manufactured on a wafer on which many thousands of such wafers are manufactured. The first write pole defining ion milling is performed at a relatively small angle relative to the wafer normal (ie. relative to a normal to the layers 502, 504) as indicated by arrow 702 in either sweeping or static mode. This step is aimed to penetrate the main pole layer.

Figure 8:
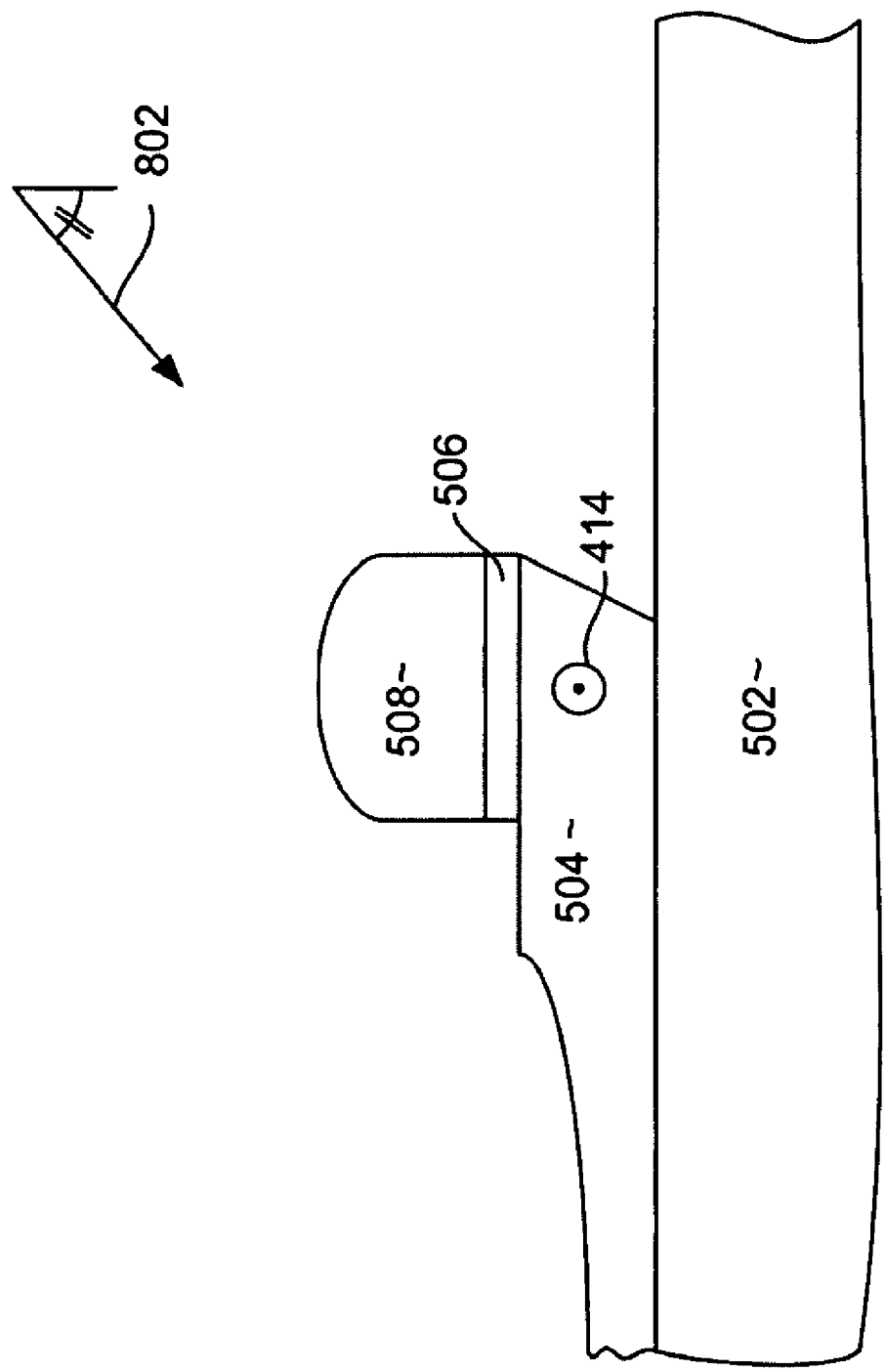

With reference now to FIG. 8, a second step of ion milling is preferably performed at a larger angle of 50-70 degrees relative to the wafer normal. The ion milling is a static ion milling, which means that the wafer is not rotated during the ion milling, as compared with a sweeping ion milling or rotating ion milling. In addition, while the static ion milling is performed, the wafer is moved laterally within the plane of the wafer in a direction perpendicular to the longitudinal axis of the write pole 414 and parallel with the air bearing surface plane ABS (FIG. 3) as will be described further below.

Figure 9:
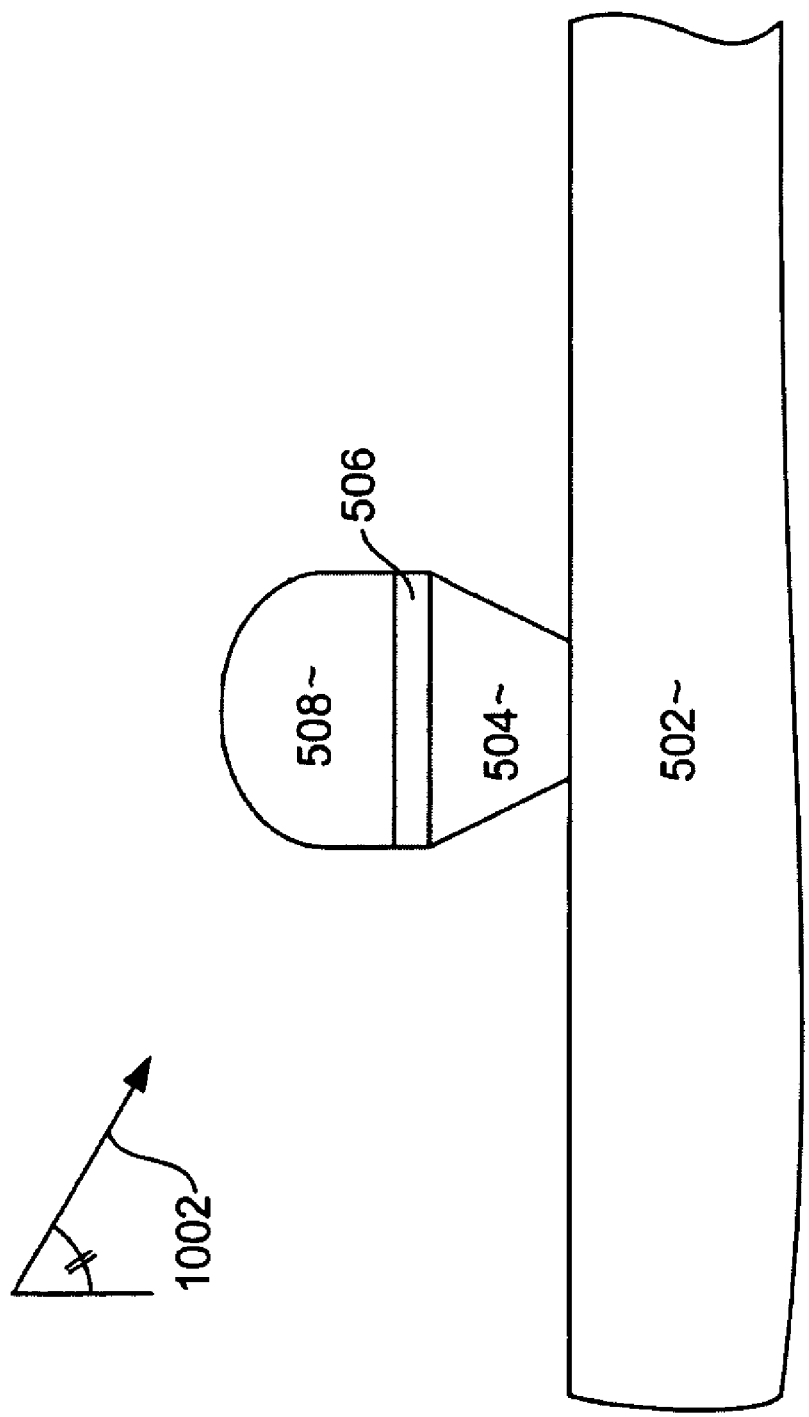

With reference now to FIG. 9, the wafer is rotated 180 degrees and a second ion milling is performed. This second ion milling is also a static ion milling, performed at an angle relative to normal as indicated by arrow 1002. As with the previous ion milling, this ion milling is preferably performed at an angle of 50-70 degrees relative to normal. This second ion milling removes material from the other side of the mask layers 508, 510 forming a write pole 504 as shown in FIG. 9. As can be seen, the high angled, static ion milling results in a write pole 504 having highly angled, tapered side walls. The high angle side wall tapers result in improved magnetic performance by reducing skew related adjacent track interference and magnetic core width increase.

Figure 10:
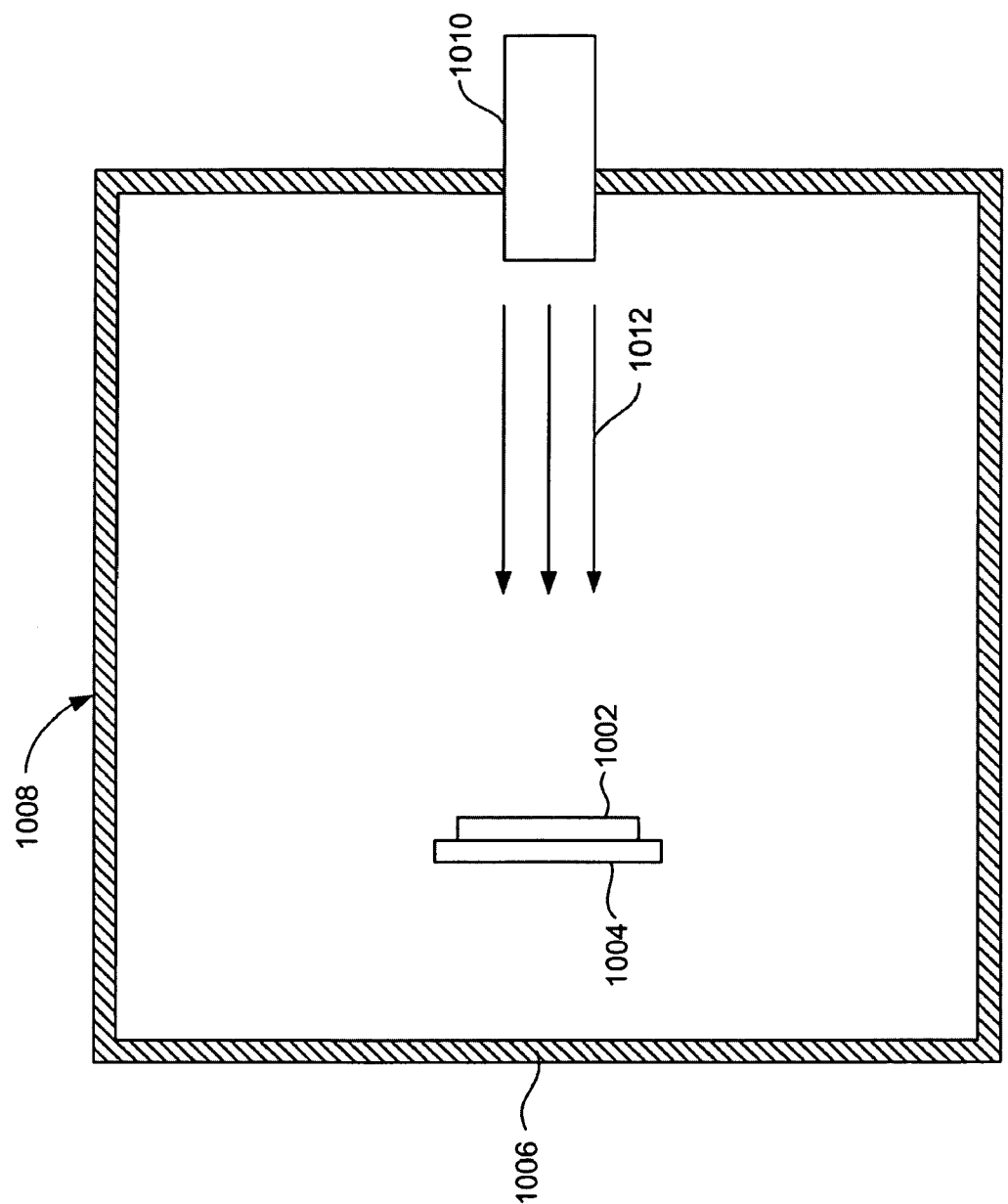
FIGS. 10-14 are schematic views illustrating an ion milling process performed according to an embodiment of the invention.

The static ion milling can be understood more clearly with reference to FIGS. 10-14. With particular reference to FIG. 10, a first ion milling is performed to transfer the image of the photoresist mask layer 510 onto the underlying mask layers 508, 506 as described above with reference to FIG. 7a, and to transfer the image of the mask layers 508, 506 onto the write pole material 504 as described above with reference to FIG. 7b. The write head is formed on a wafer 1002 along with many thousands of such write heads. The wafer is held on a chuck 1004 in a chamber 1006 of an ion milling tool 1008. An ion beam gun 1010 directs ion beam in the form of an ion beam column 1012 at the wafer. As mentioned above the wafer 1002 is held on a chuck which is connected with a chuck carriage mechanism (not shown). The chuck 1004 and wafer 1002 are arranged so that the normal of wafer 1002 is at a small angle relative to the ion beam column 1012. This ion milling is performed just sufficiently to remove portions of the hard mask layer 506 that are not protected by the above image transfer layer 508, thereby transferring the mask image onto the hard mask layer 506 as described in FIG. 7. Sweeping mode of ion milling is preferred in this step for good uniformity and minimum fence build up.

Figure 11:
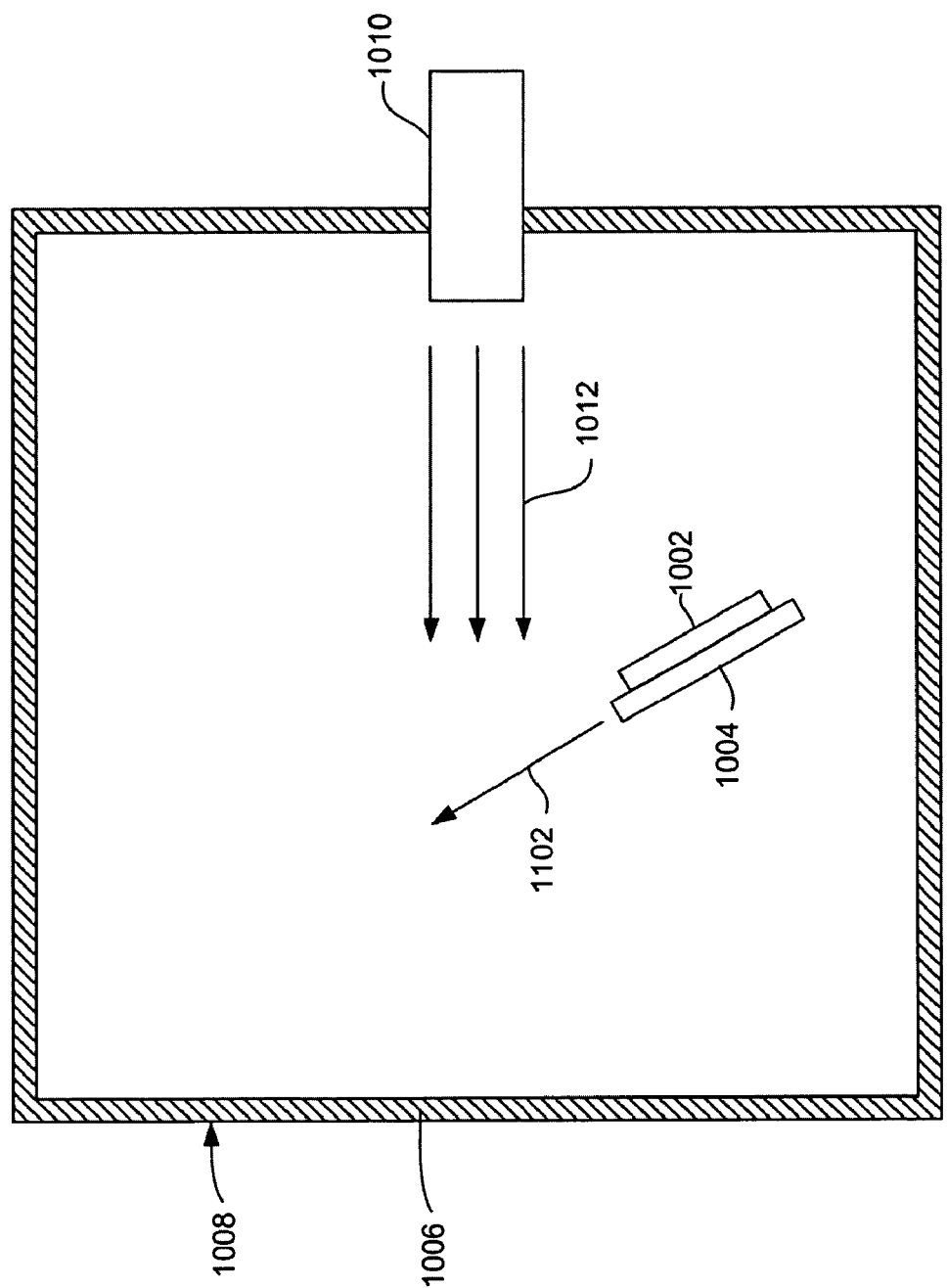

With reference now to FIG. 11, a second ion milling is performed. This ion milling corresponds to first write pole defining ion milling described with reference to FIG. 8. As can be seen, the wafer carriage (not shown) is adjusted so that the chuck 1004 and wafer 1002 are oriented at an angle relative to the ion beam column 1012. The wafer 1002 is pivoted about the longitudinal axis 414 of the write pole described above with reference to FIGS. 4 and 8, and about an axis that is normal to an air bearing surface plane. The chuck and wafer 1002, 1004 are preferably pivoted such that the wafer normal forms an angle of 50-70 degrees relative to the ion beam column 1012. The chuck and wafer are then moved laterally as indicated by arrow 1102 along a direction that is parallel with the plane of the wafer.

The wafer starts at a position outside of the ion beam column 1012 as shown in FIG. 11. Then, after the wafer starts moving, as indicated by arrow 1102, the ion beam gun 1010 is activated to form the ion beam column 1012. Because the ion beam spreads out more at spots further away from the ion source, the mill rate is higher at locations on the wafer closer to the ion source, which causes non-uniformity in ion milling if the wafer does not move linearly as described above. By moving the wafer linearly as described above during static milling (without rotation or sweeping), all the write poles along a moving line go through the same milling conditions, which will solve the uniformity issue associated with static ion milling.

Figure 12:
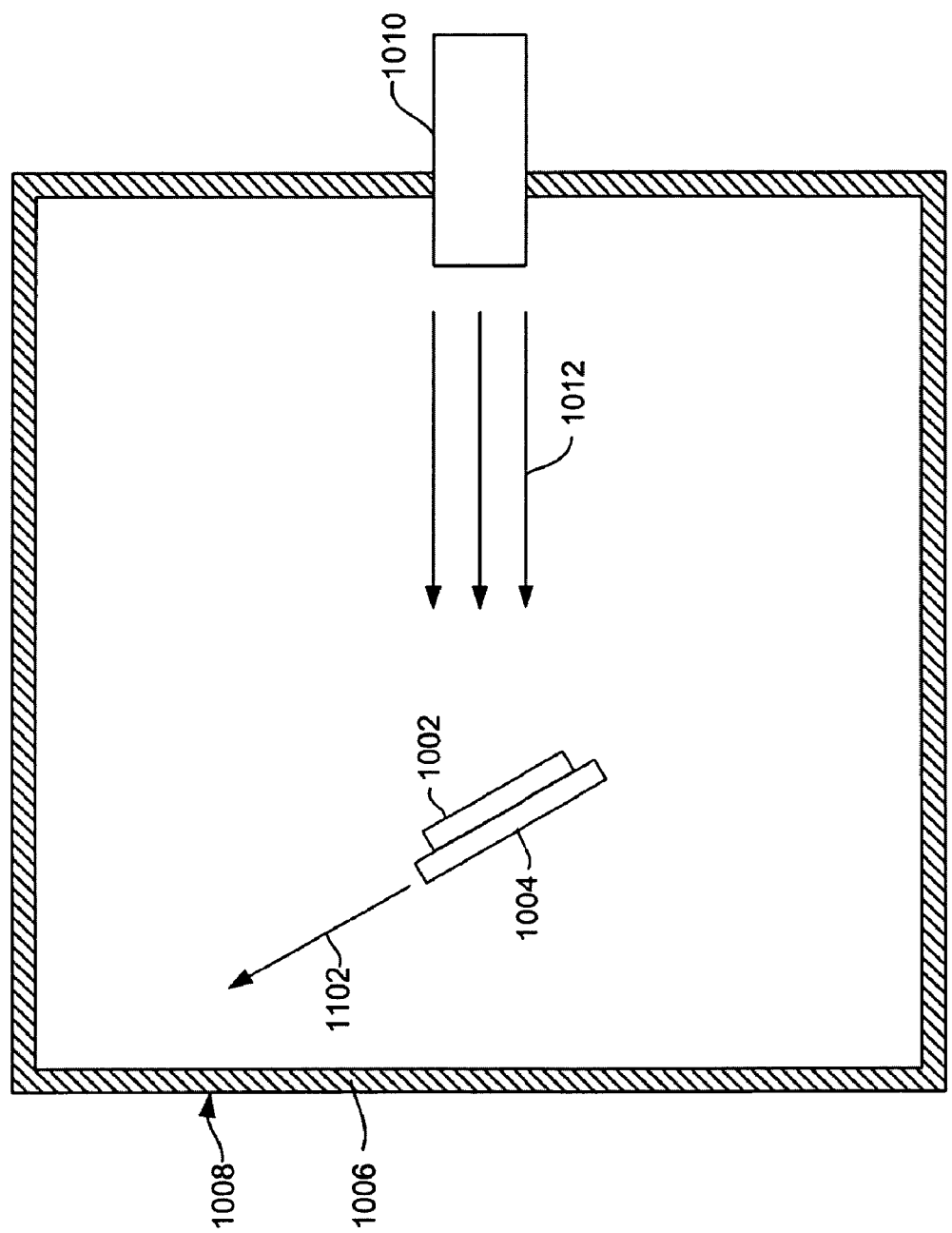
Figure 13:
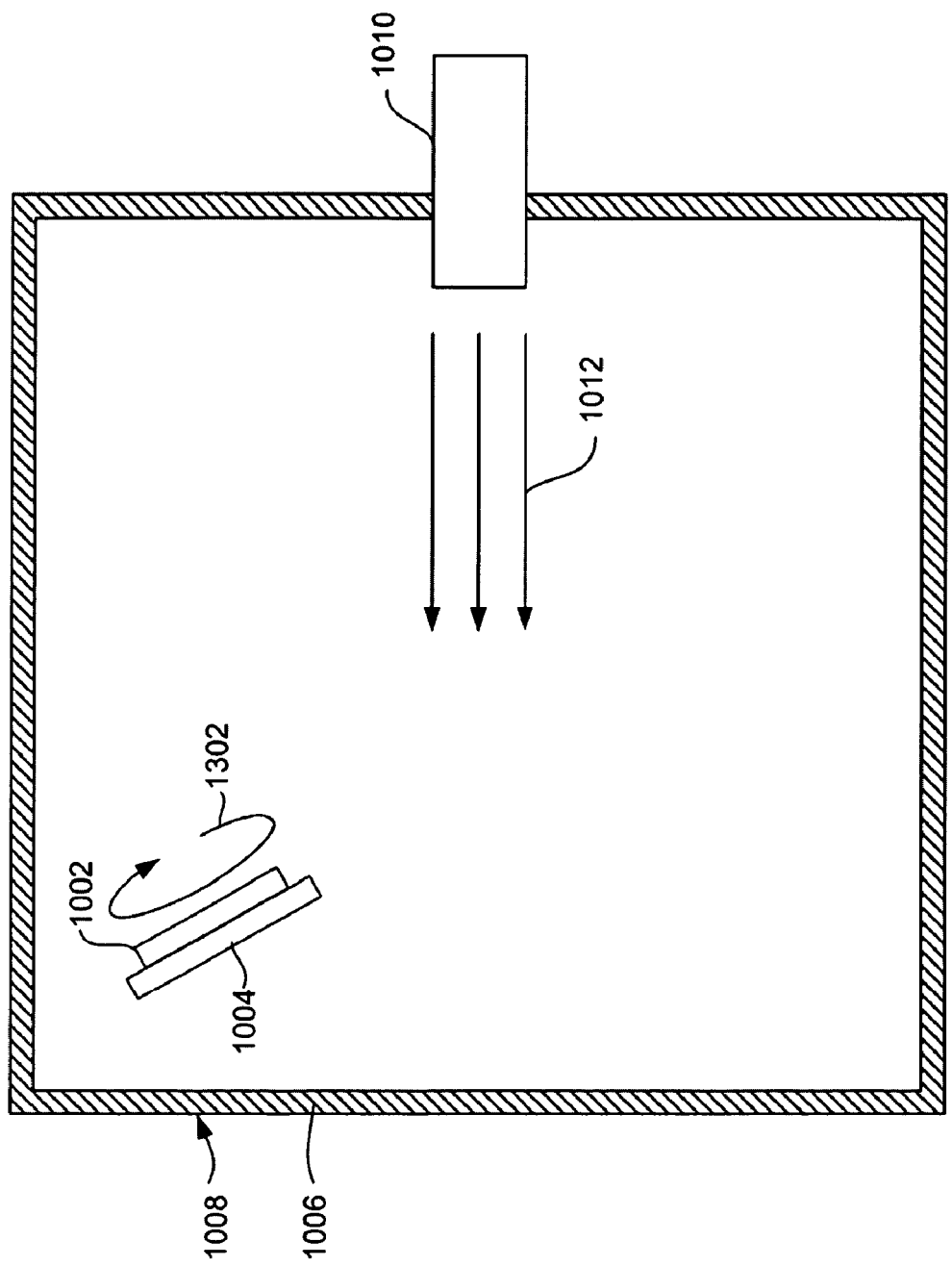

The wafer is then moved across the ion beam column 1012 as indicated in FIG. 12. As the wafer is being moved across the ion beam column 1012 it is not rotated. Because the wafer and chuck 1002, 1004 are not rotated, the ion milling is referred to as static ion milling (even though the wafer and chuck 1002, 1004 are moving laterally). This is as opposed to a rotational or sweeping ion milling, where the chuck and wafer would actually be rotating. The ion milling is continued until the wafer and chuck 1002, 1004 have once again moved outside of the ion beam column as shown in FIG. 13 at which point the ion milling can be terminated. During the ion milling as shown in FIGS. 11-13, the wafer is arranged such that the axis of the write pole is perpendicular to the direction of lateral movement 1102. In other words, the wafer is arranged so that the air bearing surface plane (ABS) (as shown in FIG. 3) is parallel with the direction of travel 1102.

Figure 14:
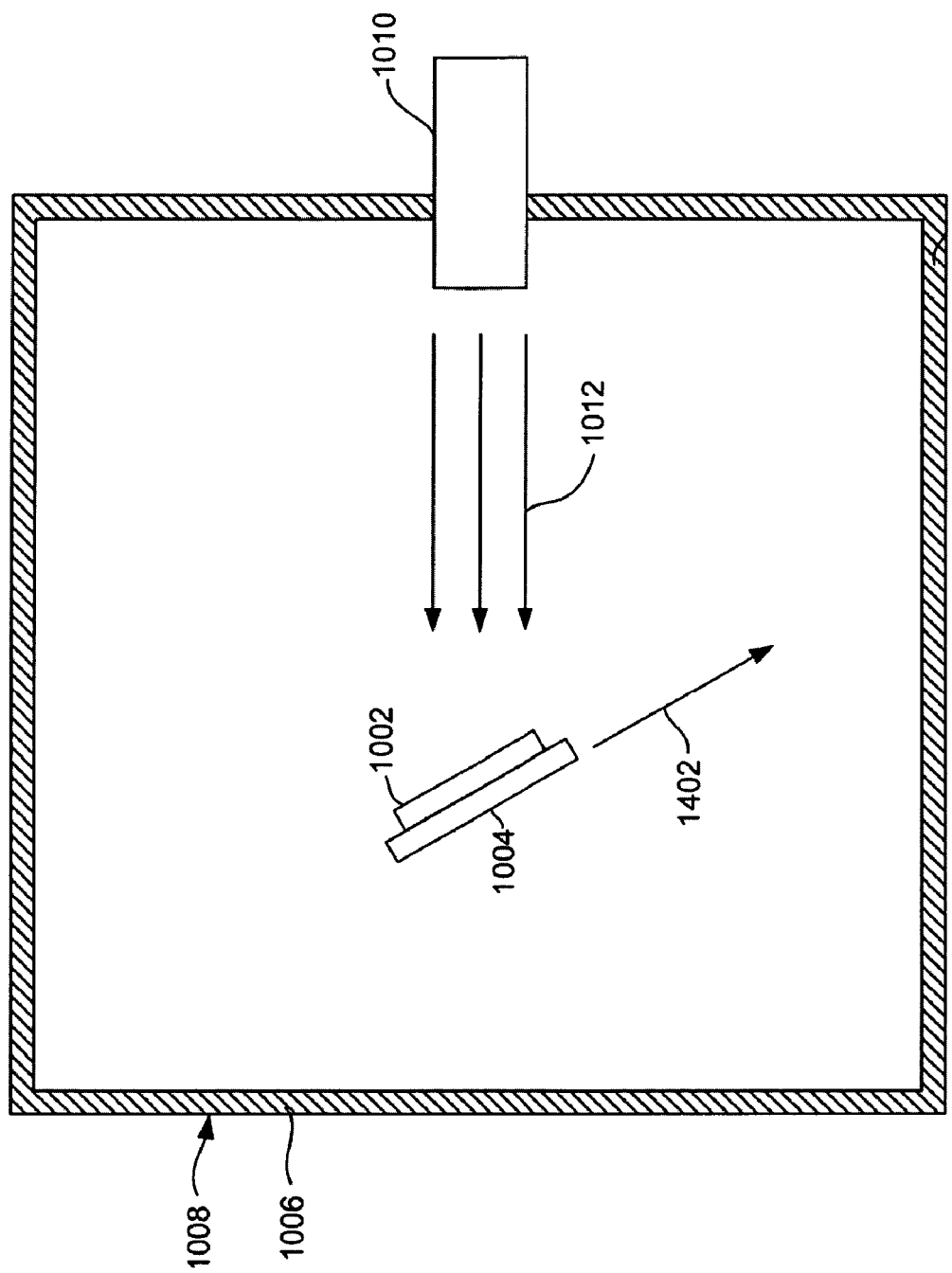

With continued reference to FIG. 13, after the wafer 1002 has moved completely outside of the ion beam column 1012 the ion milling can be temporarily terminated. The chuck 1004 and wafer 1002 can then be rotated 180 degrees as indicated by arrow 1302. Another ion milling can then be performed, as shown in FIG. 14 while moving the chuck 1004 and wafer 1002 in a second lateral direction 1402 opposite to the first direction 1102 (FIG. 12). This third ion milling (second write pole defining ion milling) is continued until the wafer 1002 again moves outside of the ion beam column. In order to prevent fence forming on any walls parallel to the ABS, a combination of the above static mill with sweeping mill may be used.

The above processes allow the formation of a write pole having a high angle of taper. Previous processes used a sweeping ion milling in which the wafer is rotated during ion milling. Although this sweeping ion milling is not capable of producing the high angle of write pole taper produced by the present invention, such sweeping ion milling and associated wafer rotation were necessary to produce a uniform ion milling across all portions of the wafer.

The present advantageously utilizes a static (i.e. non-rotational) ion milling for increased write pole taper angle. However, the lateral movement of the wafer 1002 and chuck 1004 ensures an even ion milling across the entire wafer surface. Whereas prior manufacturing methods could form a write pole having a bevel angle of only 4-5 degrees, the present invention allows the formation of a write pole having a bevel angle of 10 degrees.

In addition to providing an improved, higher taper angle, the present invention allows the use of a shorter ion milling time to form the write pole. Because of this shorter milling time, a thinner mask structure (as described in FIGS. 5-9) can be used. This results in better write pole uniformity.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic write head for perpendicular magnetic data recording, comprising:
   providing a substrate formed on a wafer;
   depositing a magnetic write pole material on the substrate;
   forming a mask structure over the magnetic write pole material;
   performing first ion milling, the first ion milling being performed at an angle relative to a normal to a surface of the wafer;
   after performing the first ion milling, performing a second ion milling, the second ion milling being performed at a larger angle relative to the normal to the surface of the wafer, and being performed while moving the wafer laterally in a linear direction without rotating the wafer;
   wherein the forming a mask structure further comprises, before performing the first and second ion millings;
   depositing a hard mask layer;
   depositing an image transfer layer;
   depositing a photoresist layer;
   photolithographically patterning the photoresist layer; and
   performing an image transfer ion milling to transfer the image of the photoresist layer onto the underlying image transfer layer and hard mask layer.

2. A method for manufacturing a magnetic write head for perpendicular magnetic data recording, comprising:
   providing a substrate formed on a wafer;
   depositing a magnetic write pole material on the substrate;
   forming a mask structure over the magnetic write pole material, the mask structure including an image transfer layer that comprises a soluble polyimed;
   performing first ion milling, the first ion milling being performed at an angle relative to a normal to a surface of the wafer;
   after performing the first ion milling, performing a second ion milling, the second ion milling being performed at a larger angle relative to the normal to the surface of the wafer, and being performed while moving the wafer laterally in a linear direction without rotating the wafer.

3. A method for manufacturing a magnetic write head for perpendicular magnetic data recording, comprising:
   providing a substrate formed on a wafer;
   depositing a magnetic write pole material on the substrate;
   forming a mask structure over the magnetic write pole material, the mask structure including a hard mask layer that comprises alumina;
   performing first ion milling, the first ion milling being performed at an angle relative to a normal to a surface of the wafer;
   after performing the first ion milling, performing a second ion milling, the second ion milling being performed at a larger angle relative to the normal to the surface of the wafer, and being performed while moving the wafer laterally in a linear direction without rotating the wafer.

4. A method for manufacturing a magnetic write head for perpendicular magnetic data recording, comprising:
   providing a substrate formed on a wafer;
   depositing a magnetic write pole material on the substrate;
   forming a mask structure over the magnetic write pole material;
   performing first ion milling, the first ion milling being performed at an angle relative to a normal to a surface of the wafer;
   after performing the first ion milling, performing a second ion milling, the second ion milling being performed at a larger angle relative to the normal to the surface of the wafer, and being performed while moving the wafer laterally in a linear direction without rotating the wafer;
   wherein the first and second ion millings are performed so as to form a write pole having first and second side walls having a taper angle of about 10 degrees.

5. A method for manufacturing a magnetic write head for perpendicular magnetic data recording, comprising:
   providing a substrate formed on a wafer;
   depositing a magnetic write pole material on the substrate;
   forming a mask structure over the magnetic write pole material;
   performing first ion milling, the first ion milling being performed at an angle relative to a normal to a surface of the wafer;
   after performing the first ion milling, performing a second ion milling, the second ion milling being performed at a larger angle relative to the normal to the surface of the wafer, and being performed while moving the wafer laterally in a linear direction without rotating the wafer;
   wherein, during the ion milling, the wafer is arranged such that a normal to a surface of the wafer forms an angle of 5-70 degrees relative to the ion beam column.

6. A method for manufacturing a magnetic write head for perpendicular magnetic data recording, comprising:
   providing a substrate formed on a wafer;
   depositing a magnetic write pole material on the substrate;
   forming a mask structure over the magnetic write pole material;
   performing first ion milling, the first ion milling being performed at an angle relative to a normal to a surface of the wafer;
   after performing the first ion milling, performing a second ion milling, the second ion milling being performed at a larger angle relative to the normal to the surface of the wafer, and being performed while moving the wafer laterally in a linear direction without rotating the wafer;
   wherein the ion milling is initiated with the wafer being located outside of the ion beam column, continues while the wafer passes through the ion beam column and is terminated when the wafer is again outside of the ion beam column.

7. A method for manufacturing a magnetic write head for perpendicular magnetic data recording, comprising:
   providing a substrate formed on a wafer;
   depositing a magnetic write pole material on the substrate;
   forming a mask structure over the magnetic write pole material;
   performing first ion milling, the first ion milling being performed at an angle relative to a normal to a surface of the wafer;
   after performing the first ion milling, performing a second ion milling, the second ion milling being performed at a larger angle relative to the normal to the surface of the wafer, and being performed while moving the wafer laterally in a linear direction without rotating the wafer;
   wherein the forming a mask structure further comprises:
      depositing a hard mask layer, an image transfer layer, and a photoresist layer;
      photolithographically patterning the photoresist layer; and
      performing an image transfer ion milling to transfer the image of the patterned photoresist layer onto the underlying hard mask layer and image transfer layer.

8. A method for manufacturing a magnetic write head for perpendicular magnetic data recording, comprising:
   providing a substrate formed on a wafer;
   depositing a magnetic write pole material on the substrate;
   forming a mask structure over the magnetic write pole material;
   performing first ion milling in an ion beam tool, the first ion milling being performed at an angle relative to a normal to a surface of the wafer;
   after performing the first ion milling, performing a second ion milling in the ion beam tool, the second ion milling being performed at a larger angle relative to the normal to the surface of the wafer, and being performed while moving the wafer laterally in a linear direction without rotating the wafer; wherein the forming a mask structure further comprises:
      depositing a hard mask layer, an image transfer layer, and a photoresist layer;
      photolithographically patterning the photoresist layer; and
      performing an image transfer ion milling to transfer the image of the patterned photoresist layer onto the underlying hard mask layer and image transfer layer;
   wherein the image transfer ion milling is performed in the ion milling tool.

9. A method for manufacturing a magnetic write head for perpendicular magnetic data recording, comprising:
   providing a substrate formed on a wafer;
   depositing a magnetic write pole material on the substrate;
   forming a mask structure over the magnetic write pole material;
   performing first ion milling, the first ion milling being performed at an angle relative to a normal to a surface of the wafer;
   after performing the first ion milling, performing a second ion milling, the second ion milling being performed at a larger angle relative to the normal to the surface of the wafer, and being performed while moving the wafer laterally in a linear direction without rotating the wafer;
   wherein the formation of the mask structure includes depositing an image transfer layer and performing an image transfer ion milling with the wafer being arranged so that a normal to the surface of the wafer is substantially parallel with an ion beam column used to perform the ion milling.

10. A method for manufacturing a magnetic write head for perpendicular magnetic data recording, comprising:
   providing a substrate formed on a wafer;
   depositing a magnetic write pole material on the substrate;
   forming a mask structure over the magnetic write pole material, the mask structure including an alumina hard mask;
   performing first ion milling, the first ion milling being performed at an angle relative to a normal to a surface of the wafer;
   after performing the first ion milling, performing a second ion milling, the second ion milling being performed at a larger angle relative to the normal to the surface of the wafer, and being performed while moving the wafer laterally in a linear direction without rotating the wafer.

11. A method for manufacturing a magnetic write head for perpendicular magnetic data recording, comprising:
   providing a substrate formed on a wafer;
   depositing a magnetic write pole material on the substrate;
   forming a mask structure over the magnetic write pole material;
   performing first ion milling, the first ion milling being performed at an angle relative to a normal to a surface of the wafer;
   after performing the first ion milling, performing a second ion milling, the second ion milling being performed at a larger angle relative to the normal to the surface of the wafer, and being performed while moving the wafer laterally in a linear direction without rotating the wafer.

12. A method for manufacturing a magnetic write head for perpendicular magnetic data recording, comprising:

providing a substrate formed on a wafer;

depositing a magnetic write pole material on the substrate;

forming a mask structure over the magnetic write pole material;

performing first ion milling, the first ion milling being performed at an angle relative to a normal to a surface of the wafer;

after performing the first ion milling, performing a second ion milling, the second ion milling being performed at a larger angle relative to the normal to the surface of the wafer, and being performed while moving the wafer laterally in a linear direction without rotating the wafer;

wherein the formation of the mask structure comprises depositing a hard mask, depositing an image transfer layer and forming a photoresist mask and performing an image transfer layer ion milling to transfer the image of the photoresist mask onto the hard mask and the image transfer layer, the hard mask layer comprises alumina, the image transfer layer comprises a soluble polyimide, and the image transfer ion milling being performed in an ion milling tool with the wafer being arranged such that a normal to a surface of the wafer is substantially parallel with the ion beam column.

13. A method for manufacturing a magnetic write head for perpendicular magnetic data recording, comprising:

providing a substrate formed on a wafer;

depositing a magnetic write pole material on the substrate;

forming a mask structure over the magnetic write pole material;

performing first ion milling, the first ion milling being performed at an angle relative to a normal to a surface of the wafer;

after performing the first ion milling, performing a second ion milling, the second ion milling being performed at a larger angle relative to the normal to the surface of the wafer, and being performed while moving the wafer laterally in a linear direction without rotating the wafer;

wherein the second ion milling is performed so as to form a write pole having first and second sides having a taper angle of about 10 degrees.

* * * * *

UNITED STATES PATENT AND TRADEMARK OFFICE
CERTIFICATE OF CORRECTION

| | | |
|---|---|---|
| PATENT NO. | : 8,108,986 B2 | Page 1 of 1 |
| APPLICATION NO. | : 11/966164 | |
| DATED | : February 7, 2012 | |
| INVENTOR(S) | : Yinshi Liu | |

It is certified that error appears in the above-identified patent and that said Letters Patent is hereby corrected as shown below:

In the claims:

col. 10, line 8, claim 8, please replace "laver" with --layer--.

Signed and Sealed this
Seventeenth Day of June, 2014

Michelle K. Lee
*Deputy Director of the United States Patent and Trademark Office*